(12) United States Patent
Breiman et al.

(10) Patent No.: US 9,712,514 B2
(45) Date of Patent: Jul. 18, 2017

(54) SUPER-SESSION ACCESS TO MULTIPLE TARGET SERVICES

(71) Applicant: Cyber-Ark Software Ltd., Petach-Tikva (IL)

(72) Inventors: Erez Breiman, Tel-Aviv (IL); Eran Pinhas, Shaarei Tikva (IL); Ran Deri, Petach-Tikva (IL); Yair Sade, Herzlia (IL); Yaron Mazor, Tel-Mond (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 146 days.

(21) Appl. No.: 14/616,712

(22) Filed: Feb. 8, 2015

(65) Prior Publication Data

US 2016/0234198 A1 Aug. 11, 2016

(51) Int. Cl.
*H04L 29/06* (2006.01)
*H04L 29/08* (2006.01)
*G06F 21/00* (2013.01)

(52) U.S. Cl.
CPC .......... *H04L 63/0815* (2013.01); *G06F 21/00* (2013.01); *H04L 67/141* (2013.01); *H04L 67/2838* (2013.01); *H04L 63/0281* (2013.01); *H04L 63/102* (2013.01); *H04L 63/1425* (2013.01)

(58) Field of Classification Search
CPC . H04L 63/08; H04L 63/0815; H04L 63/0884; H04L 63/102; H04L 63/0281; H04L 63/1408; H04L 63/1425
See application file for complete search history.

(56) References Cited

U.S. PATENT DOCUMENTS

| | | | |
|---|---|---|---|
| 6,049,820 A | * | 4/2000 | Murphy, Jr. ............ H04L 49/90 709/203 |
| 6,286,104 B1 | | 9/2001 | Buhle et al. |

(Continued)

FOREIGN PATENT DOCUMENTS

| WO | WO 2013/088212 | 6/2013 |
|---|---|---|
| WO | WO 2014/064686 | 5/2014 |

OTHER PUBLICATIONS

Applicant-Initiated Interview Summary Dated Apr. 18, 2016 From the US Patent and Trademark Office Re. U.S. Appl. No. 14/154,200.

(Continued)

*Primary Examiner* — Linglan Edwards

(57) ABSTRACT

A method of establishing privileged communication sessions to target services unifies multiple sub-sessions into a single super-session. The user client requests access to target services. The request includes authentication credentials. Using the authentication credentials, privileged credentials are retrieved for target services requiring privileged access. Interactive sub-sessions are established between an intermediate element and respective target services. Required credentials are provided by the intermediate element to the target services. The interactive sub-sessions are unified into a single super-session on the intermediate element, and the super-session is established with the user client. The super-session provides the user client with interactive control of each of the interactive sub-sessions. Data communication between the user client and the target services is conducted via the intermediate element.

37 Claims, 10 Drawing Sheets

(56) References Cited

U.S. PATENT DOCUMENTS

| | | | | |
|---|---|---|---|---|
| 6,829,474 | B1* | 12/2004 | Adachi | H04M 3/42153 379/201.01 |
| 6,986,040 | B1 | 1/2006 | Kramer et al. | |
| 7,631,347 | B2* | 12/2009 | Cam-Winget | H04L 63/0815 726/8 |
| 8,281,381 | B2* | 10/2012 | Kranendonk | H04L 63/0815 726/8 |
| 8,683,042 | B1* | 3/2014 | Manning | H04M 15/66 455/406 |
| 2005/0015490 | A1* | 1/2005 | Saare | H04L 63/0815 709/225 |
| 2007/0067638 | A1* | 3/2007 | Haibl | H04L 63/0884 713/182 |
| 2007/0192494 | A1* | 8/2007 | Yamakawa | H04L 67/14 709/227 |
| 2008/0196101 | A1 | 8/2008 | Sade et al. | |
| 2009/0070869 | A1* | 3/2009 | Fan | G06F 21/51 726/22 |
| 2011/0321120 | A1 | 12/2011 | Saxena et al. | |
| 2012/0124205 | A1 | 5/2012 | Muret et al. | |
| 2013/0191631 | A1 | 7/2013 | Ylonen et al. | |
| 2014/0181939 | A1 | 6/2014 | Bonnell | |
| 2015/0200821 | A1 | 7/2015 | Sade et al. | |
| 2015/0271162 | A1 | 9/2015 | Dulkin et al. | |
| 2016/0006712 | A1 | 1/2016 | Sade et al. | |
| 2016/0006765 | A1 | 1/2016 | Shem Tov et al. | |

OTHER PUBLICATIONS

Official Action Dated May 13, 2016 From the US Patent and Trademark Office Re. U.S. Appl. No. 14/217,649.
Wikipedia "Processor", From Wikipedia, The Free Encyclopedia, 2.P, May 7, 2016.
Applicant-Initiated Interview Summary Dated Jun. 10, 2015 From the US Patent and Trademark Office Re. U.S. Appl. No. 14/217,649.
European Search Report and the European Search Opinion Dated May 15, 2015 From the European Patent Office Re. Application No. 15150412.3.
Official Action Dated Jun. 17, 2015 From the US Patent and Trademark Office Re. U.S. Appl. No. 14/217,649.
Official Action Dated Feb. 26, 2015 From the US Patent and Trademark Office Re. U.S. Appl. No. 14/217,649.
Centrify Corporation "Centrify Server Suite: Unified Identity Management and Audit Across On-Premise and Cloud-Based Windows, Linux, and UNIX Servers", Data Sheet, Centrify Corporation, 2 P., 2014.
Citrix "Citrix XenServer. Industry-Leading Open Source Platform for Cost- Effective Cloud, Server and Desktop Virtualization", Citrix Systems Inc., Product Overview, 7 P., 2013.
Citrix "XenApp Smart Auditor", Citrix eDocs, Jan. 23, 2014.
CyberArk "Discovery & Audit", CyberArk DNA, Product Discription Brochure, Cyber-Ark Software Company, 2 P., Nov. 2013.
CyberArk "Privileged Identity Management Suite 7.0", Cyber-Ark Software, Ltd., Version 7.2, 4 P., Aug. 23, 2013.
CyberArk "Privileged Threat Analytics™", CyberArk Software Ltd., 2 P., 2013.
Cyber-Ark "Application Identity Manager™", Cyber Ark Software, Ltd., Datasheet, 2 P.
Cyber-Ark "Application Password Management", Cyber-Ark Software Ltd., Datasheet, 2 P., Feb. 2007.
Cyber-Ark "Enterprise Password Vault™ 4.5", Cyber-Ark Software Ltd., Brochure, 4 P., Nov. 2007.
Cyber-Ark "On-Demand Privileges Manager™ for Unix/Linux", Cyber Ark Software, Ltd., Datasheet, 2 P.
Cyber-Ark "On-Demand Privileges Manager™ for Windows", Cyber Ark Software, Ltd., Datasheet, 2 P., 2009.
Cyber-Ark "On-Demand Privileges Manager™", Cyber-Ark Software Ltd., Brochure, 2 P., Apr. 2010.
Cyber-Ark "Privileged Identity Management 5.0", Cyber-Ark Software Ltd., Brochure, 4 P., Apr. 2009.
Cyber-Ark "Privileged Identity Management Suite 7.0", Cyber-Ark Software, Ltd., PIM Brocure, 4 P., 2010.
Cyber-Ark "Privileged Session Management Suite 7.0", Cyber Ark Software, Ltd., PSM Brochure, 4 P., 2010.
Cyber-Ark "Privileged Session Manager™", Cyber-Ark Software Ltd., Datasheet, 2 P., Mar. 2009.
Gartner PAM "Beyondtrust: PowerBroker Identity Services for Active Directory Bridging. Extend Microsoft® Active Directory Authentication and Single-On Capabilities + Group Policy Configuartion Management to UNIX, Linux and Mac Systems", Whitepaper, Gartner PAM Market Guide, 2 P., 2014.
Khan et al. "Oracle® Identity Manager: Connector Guide for UNIX, Release 11.1.1, E17694-06", Oracle, 128 P., Feb. 2014.
Observelt "Are You Monitoring Your Fastest Growing Threat? User-Based Threats: Identifying Suspicious Activities and Understanding Intent", Observelt, Overview Brochure, 2 P., Jan. 2015.
Observelt "ObserveIT Enterprise User Activity Monitoring", Observelt, Product Documentation, Version 5.6.8, Jan. 23, 2014.
Oracle "Oracle Identity Manager 11g", Data Sheet, Oracle, 3 P., 2011.
Wikipedia "Remote Desktop Protocol", Wikipedia, the Free Encyclopedia, 7 P., LastModified Sep. 16, 2014.
Applicant-Initiated Interview Summary Dated Feb. 23, 2016 From the US Patent and Trademark Office Re. U.S. Appl. No. 14/217,649.
Official Action Dated Feb. 1, 2016 From the US Patent and Trademark Office Re. U.S. Appl. No. 14/154,200.
Hitachi Privileged-Access-Management, Hitachi ID Systems, Inc., 2 Pages, 2016.
European Search Report and the European Search Opinion Dated Nov. 6, 2015 From the European Patent Office Re. Application No. 15173242.7.
Official Action Dated Nov. 6, 2015 From the US Patent and Trademark Office Re. U.S. Appl. No. 14/217,649.

* cited by examiner

SUPER-SESSION ACCESS TO MULTIPLE TARGET SERVICES

BACKGROUND

The present invention, in some embodiments thereof, relates to establishing a computer super-session which includes multiple sub-sessions and, more specifically, but not exclusively, to establishing a super-session which provides a unified user experience.

Organizations often monitor sessions between users and target systems and services within or outside the organization.

Existing session management security solutions offer monitoring and auditing support for privileged sessions to single or multiple sensitive target services. When an end-user starts multiple sessions to target services, each of those sessions is monitored and audited separately. The information collected throughout those sessions is kept separately for each session and actions between those sessions are not correlated. As a result, an auditor auditing the multiple sessions does not have a wide-scope view of the actions that took place throughout the end user's multiple sessions. Information correlating the sessions may be missing. Also, related actions that took place throughout one or more of those said sessions are not identified.

Current solutions for performing and monitoring sessions throughout an organization include:

A) Some user activity monitoring solutions enable the organization to monitor normal or privileged sessions. The monitored sessions may be to multiple targets, but the users must provide the credentials for each of those targets separately.

B) Privileged System Management (PSM)-Sessions are initiated, monitored and controlled by a proxy server which serves as an intermediate between the user and the target system. This approach may be integrated with a Privileged Account Management System (PAMS) which authenticates and manages user credentials. PSM solutions typically allow the user to establish a privileged session to a single target service without having to enter the target credentials.

C) Single Sign On (SSO) solutions allow the user to perform privileged sessions. The performed sessions may access multiple target services and are partially monitored to keep session metadata.

FIG. 1 illustrates a prior art method of a user initiating sessions to two target services. The user initiates two sessions independently (to resources A' and B'), in 110 and 130. In 120 and 140, each session is managed separately by a PSM system.

FIG. 2 illustrates a prior art method of auditing multiple sessions to respective target services. In 210, the auditor audits one session established with a single target service. In 220 the auditor monitors any additional sessions to respective target services independently. In 230 the auditor manually correlates between the multiple audited sessions.

In addition, existing privileged session management tools that automatically open sessions to multiple targets do not provide a unified user experience for the multiple sessions. The end user interacts with each target services separately, thus the user experience is degraded.

SUMMARY

In embodiments herein, access to target services by a user client is managed by an intermediate element which resides between the user client and the target services. The intermediate element establishes sub-sessions with respective target services, unifies the sub-sessions into a single super-session and establishes the super-session with the user client. Optionally, the intermediate element determines user client authorization to access the target services so that sub-sessions may be established only with target services which the user and/or user client is authorized to access. In some embodiments, the intermediate element also performs credential management in order to establish privileged sessions with target services as required, without exposing the privileged credentials to the user client. Optional embodiments include monitoring, auditing and task management capabilities.

According to an aspect of some embodiments of the present invention there is provided a method of establishing privileged communication sessions to target services. The method includes, at an intermediate element: receiving from a user client a request to access a plurality of target services; using the authentication credentials, retrieving, for at least one of the target services, a respective set of privileged credentials; establishing multiple interactive sub-sessions between the intermediate element and respective ones of the target services; unifying the plurality of interactive sub-sessions into a single super-session on the intermediate element; and establishing the single super-session with the user client such that the single super-session provides the user client with interactive control of each of the plurality of interactive sub-sessions. The request includes authentication credentials. At least one of the sub-sessions is established with the respective set of privileged credentials. Data communication between the user client and the target services is conducted via the intermediate element.

According to some embodiments of the invention, the method further includes: at the intermediate element, establishing the single super-session such that the user experience of interaction with the plurality of interactive sub-sessions is that of multiple communication sessions running in the same execution environment.

According to some embodiments of the invention, the method further includes: at the intermediate element, establishing the single super-session such that the sharing of resources amongst the plurality of interactive sub-sessions is that of multiple communication sessions running in the same execution environment. According to some embodiments of the invention, the resources include at least one of: a data file, a memory, a CPU and a clipboard.

According to some embodiments of the invention, the method further includes: at the intermediate element, communicating with the user client, over a communication network, as a remote desktop server.

According to some embodiments of the invention, the method further includes: determining, using the authentication credentials, an authorization of the user client to access the target services; and preventing establishment of sub-sessions with unauthorized target services.

According to some embodiments of the invention, the request includes a list of requested target services and the sub-sessions are established with the listed target services.

According to some embodiments of the invention, the request is a request to establish a super-session, the method further includes: receiving from the user client, after the super-session is established between the user client and the intermediate element, a list specifying the target services, wherein the sub-sessions are established with the listed target services.

According to some embodiments of the invention, the request is a request to perform a specified task, and at least one of the target services are derived, at the intermediate element, from the specified task.

According to some embodiments of the invention, the method further includes: at the intermediate element, monitoring user client activities during the super-session, detecting when the activities deviate from activities required to perform a specified task and triggering an action when a deviation is detected.

According to some embodiments of the invention, the action is at least one of: terminating at least one of the sub-sessions, terminating the super-session and notifying an administrator.

According to some embodiments of the invention, the method further includes: at the intermediate element, auditing the super-session and detecting anomalies in user client utilization of the target services.

According to some embodiments of the invention, the method further includes: at the intermediate element, adding a sub-session to the super-session. According to some embodiments of the invention, the sub-session is added in response to at least one of: a request from the user client to connect to an additional target service; a task management requirement; and an instruction from an administrator.

According to some embodiments of the invention, the method further includes: at the intermediate element, removing a sub-session from the super-session. According to some embodiments of the invention, the sub-session is removed in response to at least one of: a request from the user client to disconnect from a target service; a task management requirement; a security protocol requirement; and an instruction from an administrator.

According to some embodiments of the invention, at least one of the sub-sessions is established with the authentication credentials.

According to some embodiments of the invention, the intermediate element resides on one of: a server functioning as a proxy between the user client and target service and a machine on which the user client resides.

According to some embodiments of the invention, the privileged credentials are retrieved from a privileged account management system (PAMS).

According to an aspect of some embodiments of the present invention there is provided a session manager apparatus. The session management apparatus includes a hardware processor, a request management module, a credential retrieval module, and a super-session module. The request management module receives a request from a user client to establish sessions with multiple target services. The request includes authentication credentials. The credential retrieval module uses the authentication credentials to retrieve, for at least one of the target services, a respective set of privileged credentials. The super-session module establishes interactive sub-sessions with the target services, unifies the interactive sub-sessions into a single super-session, and establishes the super-session with the user client such that the super-session provides the user client with interactive control of each of the interactive sub-sessions. At least one of the sub-sessions is established with the respective set of privileged credentials.

According to some embodiments of the invention, the credential retrieval module determines a respective authorization to access the target services, and the super-session module establishes sub-sessions only with authorized target services.

According to some embodiments of the invention, the super-session module establishes the single super-session such that the user experience of interaction with the multiple interactive sub-sessions is that of multiple communication sessions running in the same execution environment.

According to some embodiments of the invention, the super-session module establishes the single super-session such that the sharing of resources amongst the interactive sub-sessions is that of multiple communication sessions running in the same execution environment.

According to some embodiments of the invention, the request is a request to perform a specified task, and the request management module derives at least one of the target services from the specified task.

According to some embodiments of the invention, data communication between the user client and the target services is conducted via the session manager apparatus.

According to some embodiments of the invention, the session manager apparatus further includes a network interface for electrical communication over a communication network with at least one of the user client and a system node running a target service.

According to some embodiments of the invention, the session manager apparatus runs on a proxy server inline between the user client and the target services.

According to some embodiments of the invention, the session manager apparatus runs on an endpoint machine hosting the user client.

According to some embodiments of the invention, the session manager apparatus further includes a monitoring module which performs at least one of: monitoring user client activities during the super-session; monitoring user client activities during a sub-session; detecting when user client activities deviate from activities required to perform a specified task; triggering an action when user client activities during the super-session deviate from activities required to perform a specified task; auditing the super-session and detecting anomalies in user client utilization of the target services.

According to an aspect of some embodiments of the present invention there is provided a computer program product for establishing privileged communication sessions to target services. The computer program product includes:

a computer readable storage medium;

first program instructions to receive from a user client a request to access multiple target services, wherein the request comprises authentication credentials;

second program instructions to use the authentication credentials to retrieve a respective set of privileged credentials for at least one of the target services;

third program instructions to establish multiple interactive sub-sessions between the intermediate element and respective ones of the target services, wherein at least one of the sub-sessions is established with the respective set of privileged credentials;

fourth program instructions to unify the interactive sub-sessions into a single super-session; and fifth program instructions to establish the single super-session with the user client, such that the single super-session provides the user client with interactive control of each of the plurality of interactive sub-sessions, wherein data communication between the user client and the target services is conducted via an intermediate element, and wherein the first, second, third, fourth and fifth program instructions are stored on the computer readable storage medium.

According to some embodiments of the invention, the third program instructions establish the sub-sessions between the intermediate element and the target services, and the fifth program instructions establish the super-session between the intermediate element and the user client.

According to some embodiments of the invention, the computer program product further includes sixth program instructions, stored on the computer readable storage medium, to determine a respective authorization to access the target services, wherein sub-sessions are established only with authorized target services.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
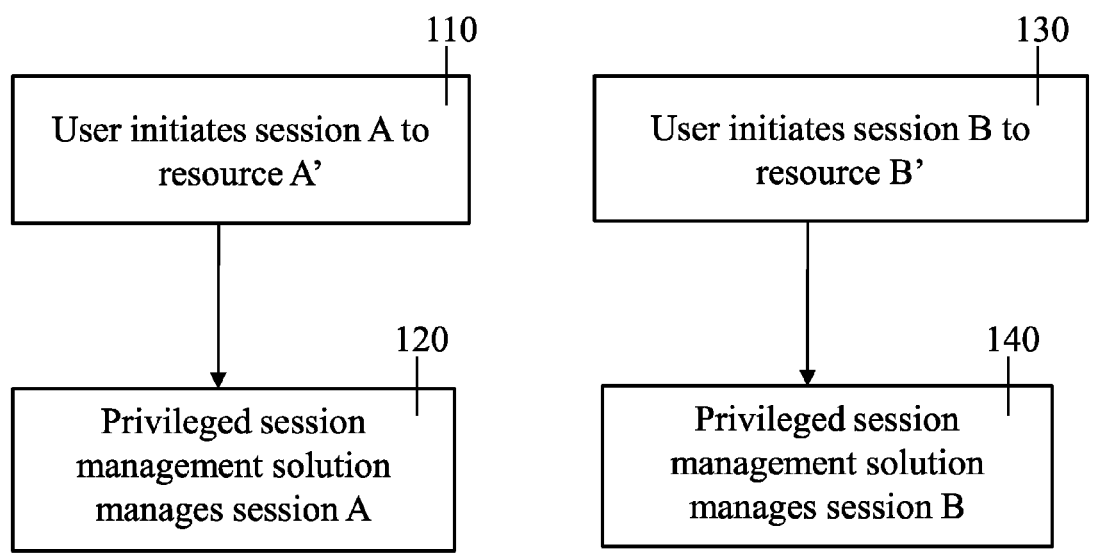
FIG. 1 is a prior art method of a user initiating sessions to two target services.
Figure 2:
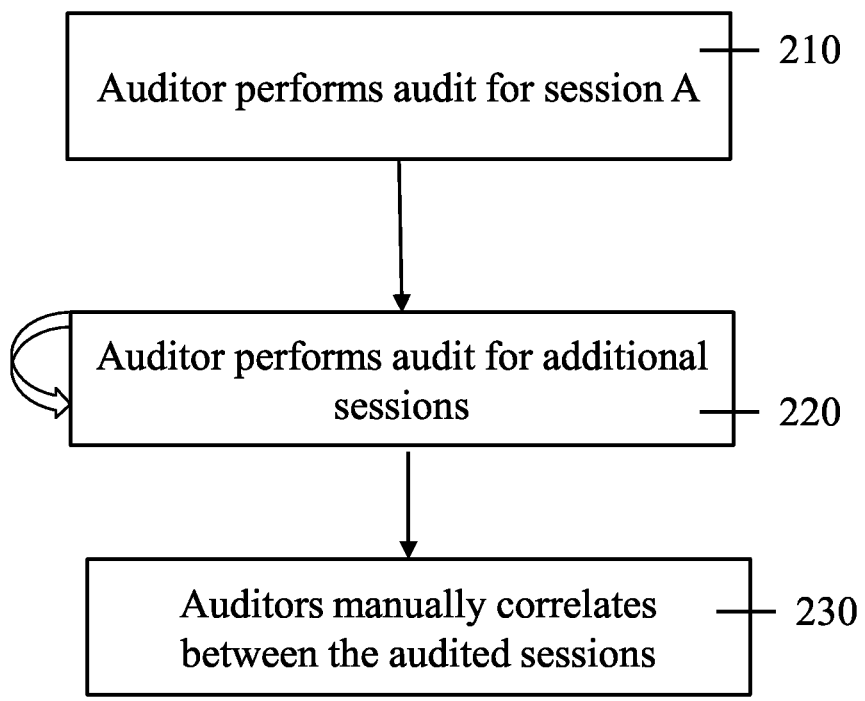
FIG. 2 is a prior art method of auditing multiple sessions to respective target services.

The present invention, in some embodiments thereof, relates to establishing a computer super-session which includes multiple sub-sessions and, more specifically, but not exclusively, to establishing a super-session which provides a unified user experience.

Embodiments described herein present a session management approach for a user client accessing multiple target services. In order to access the target services, the user client requests access to the target services from an intermediate element. The intermediate element is located on the communication channel between the user client and the target services, and serves as a control point for establishing and terminating sessions with the user client and with target services.

Separate sessions are established between the intermediate element and each target service. The separate sessions (denoted sub-sessions) are unified into a single session (denoted a super-session) which is established between the intermediate element and the user client. During the super-session the user client has interactive control of each of the target services, but all interaction between the user client and the target services is performed via the intermediate element.

The order in which the sub-sessions and super-session are established may vary. In some embodiments, the user client request includes a list of requested target services. The intermediate element establishes sub-sessions with at least some of the listed target services and unifies the sub-sessions into the super-session with the user client. Alternately or additionally, a super-session is created with the user client, sub-sessions are then established with target services per user request and/or as needed, and the sub-sessions are incorporated into the super-session.

Optionally, target services may later be added and/or removed from the super-session services per user request and/or as needed.

Optionally, establishing a super-session includes creating a super-session data record as described in more detail below. Optionally, establishing a sub-session includes creating a sub-session data record as described in more detail below. Optionally, incorporating a sub-session into the super-session includes adding the sub-session data record or portions thereof to the super-session data record.

The user client request includes the authentication credentials which are used for credential management. Optionally, the authentication credentials are used to authenticate the user and to determine whether the user client is authorized to access all of the requested the target services. However the authentication credentials do not enable the user client to directly access all of the target services.

In some embodiments, when the user client accesses a target service which requires privileged credentials, the privileged credentials are obtained by the intermediate element and are used by the intermediate element to establish the sub-session with the target system. The privileged credentials are not provided to the user client, so that the user client cannot bypass the control point by establishing a direct session with the target service.

Optionally, the super-session is established such that the user experience (UX) of interaction with the sub-sessions is that of multiple communication sessions running in the same execution environment.

Some embodiments of the invention include one or more of:

1) Task management to ensure proper task workflow;
2) Centralized administrative permission to access multiple target services;
3) Monitoring and auditing of user client activities during the super-session; and
4) Correlation between activities performed during multiple sub-sessions and/or on the same target service.

As used herein the term "target service application" means an application running on the intermediate element which enables user client interaction with target services through windows, consoles or any other user interaction method.

Throughout this document, the phrases "user experience of interaction with the plurality of interactive sub-sessions is that of a multiple communication sessions running in the same execution environment", "unified user experience" and similar terms generally mean that the user can easily switch between windows of the target service applications participating in the super-session, and interact with the participating target services without switching to separate desktop environments. Examples of interactions include moving and resizing of windows of target service applications, having the windows appear in the user's taskbar with the original target service icon and name (where relevant), providing keyboard, mouse and other input (as configured and applicable), interaction between target service applications, shared resources (such as files, memory, CPU, clipboard and others) between the target service applications and the like. The aforementioned features depend on the OS (operating system) capabilities and other, optionally, limitations as enforced by the organization. However, overall the user experiences interaction with multiple target services running as separate sub-sessions as if they were interacting with a single session running multiple target service applications.

As used herein the term "intermediate element" means a system element along the communication channel between the user client and the target services, which accesses the target services for the user client and transfers data between the user client and the target services.

As used herein the term "user client" means an element running on a user endpoint (such as a terminal or personal computer) which requests access to a target service. Optionally a user client includes a user interface which enables a human user to initiate the request and/or utilize the target service when provisioned credentials are created. Optionally, a user client is an application which requests access to a target service independently (without receiving a request from a human user).

As used herein the term "user" means the entity which interacts with the target services during the super-session, and includes human users operating the user client through a user interface.

As used herein the term "target service" means a resource access to which is requested by a user client. The term "target service" includes applications, systems, servers and other machines, which may reside on an endpoint or be accessible over a communication network. The term "target services" is intended to encompass resources which are on-premise (e.g. within an organizational network), on a local server, on a remote server, in the Cloud or on other types of system node.

As used herein the term "sub-session" means a sequence of communications in a defined period between an intermediate element and a single target service. As used herein the "privileged sub-session" is a sub-session in which at least some activities require privileged credentials to access or operate on the target service.

As used herein the term "super-session" means a single session between the user client and the intermediate agent through which an interaction with a group of sub-sessions is performed.

In this description, the terms "credentials" and "credential set" mean any type of information that may be used for authentication. A credential set may include one or more of: an account name and password, SSH keys, certificates, biometric information, access tokens, one-time passwords and any other type of credentials which may be used for accessing system resources and/or accessing services and/or for authentication.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out activities of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of activity steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and activity of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
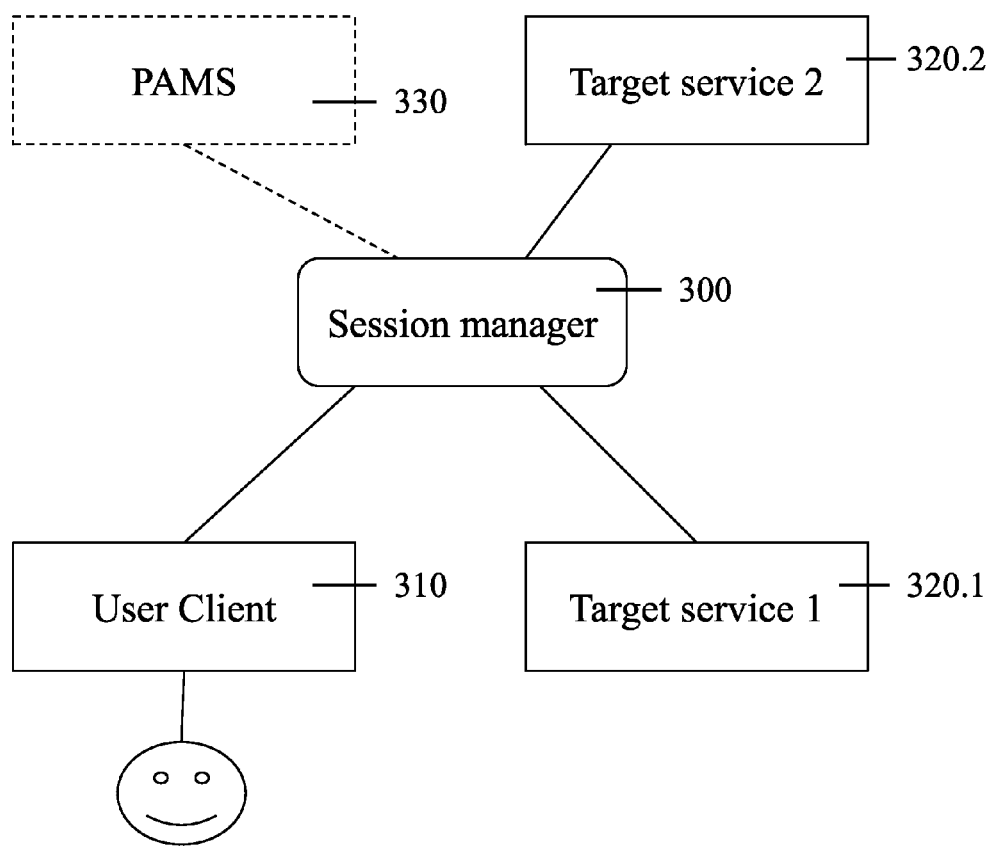
FIG. 3 is a simplified network diagram of a user client obtaining access to target services through a session manager, according to embodiments of the invention.

Reference is now made to FIG. 3, which is a simplified network diagram of a user client obtaining access to target services through a session manager, according to embodiments of the invention. For clarity, FIG. 3 shows a non-limiting example having two target services (320.1 and 320.2), however other numbers of target services may be accessible.

Session manager 300 serves as an intermediate element between user client 310 and target services 320.1 and 320.2 (and possibly other target services not shown). Session manager 300 establishes separate sub-sessions with the target services, unifies them into a super-session, and establishes the super-session as a single session with the user client (i.e. between session manager 300 and user client 310).

Session manager 300 may be located on any system or network element which enables it to serve as an intermediate between the user client and the target services. In some embodiments, session manager 300 is located on a proxy server between the user client and the target services. In alternate or additional embodiments, session manager 300 runs on an endpoint machine on which the user client resides. Optionally, session manager 300 is distributed over multiple endpoints and/or user client endpoints and/or servers in a network.

Session manager 300 also performs credential management. The user client has authentication credentials which it provides to session manager 300. The authentication credentials are used to authenticate the user, but do not allow the user client to access (e.g. establish a session with) at least one of the target services directly.

Optionally, session manager 300 obtains the privileged credentials by providing the authentication credentials to a credential management element. The credential management element authenticates the user from the authentication credentials and returns the privileged credentials to session manager 300.

Optionally the credential management element is Privileged Account Management System (PAMS). PAMS is a system which manages privileged accounts, access and actions in accordance with organizational policy, mainly by controlling and managing the credentials to privileged accounts (i.e. privileged credentials). The PAMS may include user authentication, mapping of which users are allowed usage of which privileged account and logging of privileged accounts usage. The PAMS may include additional features such as monitoring of actions performed by privileged users. Yet additional features include support of various workflows, for example managerial approval for password retrieval, correlation with ticketing systems, one-time passwords and password replacement. Thus the PAMS is able to support and enforce organizational policies and procedures for network security and access control. The PAMS may be, for example, a system commercially available as PIM (Privileged Identity Management)/PSM (Privileged Session Management) Suite, from CyberArk® Software Ltd. Petakh Tikva, Israel, www(dot)cyberark(dot)com, as modified to serve for credential management as described herein.

Optionally, credentials for establishing sub-sessions with target services are obtained by session manager 300 from one or more of:

i) A credential repository on the intermediate element;
ii) A network-connected element (such as a network-connected database or file storage); and
iii) A PAMS.

Additionally or alternately, the credentials are derived by session manager 300 from a local configuration and/or logic.

In some embodiments, session manager 300 is in communication with PAMS 330. In order to authenticate the user client and to obtain privileged and/or shared credentials, session manager 300 provides the authentication credentials to PAMS 330. PAMS 330 determines whether the user client has authorization to access the target services, and provides session manager 300 with the credentials necessary for accessing the target service (e.g. privileged credentials). Further optionally, PAMS 330 first determines whether the user client has authorization to access the target services, and provides credentials allowing the user client to establish sub-sessions only with authorized target services.

Optionally, PAMS 330 supports session manager 300 with security and session management functions, such as managing privileged accounts, access to resources and other actions in accordance with organizational policy. These PAMS functions are performed mainly by controlling and managing the credentials to privileged accounts (i.e. privileged credentials).

Optionally, session manager 300 uses specified logic to determine the validity of the authentication credentials and/or to check whether the user is authorized to access the target services.

Optionally, session manager 300 includes remote desktop functionality which provides a unified user experience to the super-session. Multiple sub-sessions are displayed to the user and interacted with by the user as if they were part of a single session. Optionally, session manager 300 establishes the super-session such that the sharing of resources amongst said plurality of interactive sub-sessions is that of multiple communication sessions running in the same execution environment. Examples of shareable resources include: files, memory, CPU and clipboard.

Session manager 300 optionally performs other functions, such as session monitoring, task management, resource sharing and/or auditing, as described in more detail below.

Figure 4:
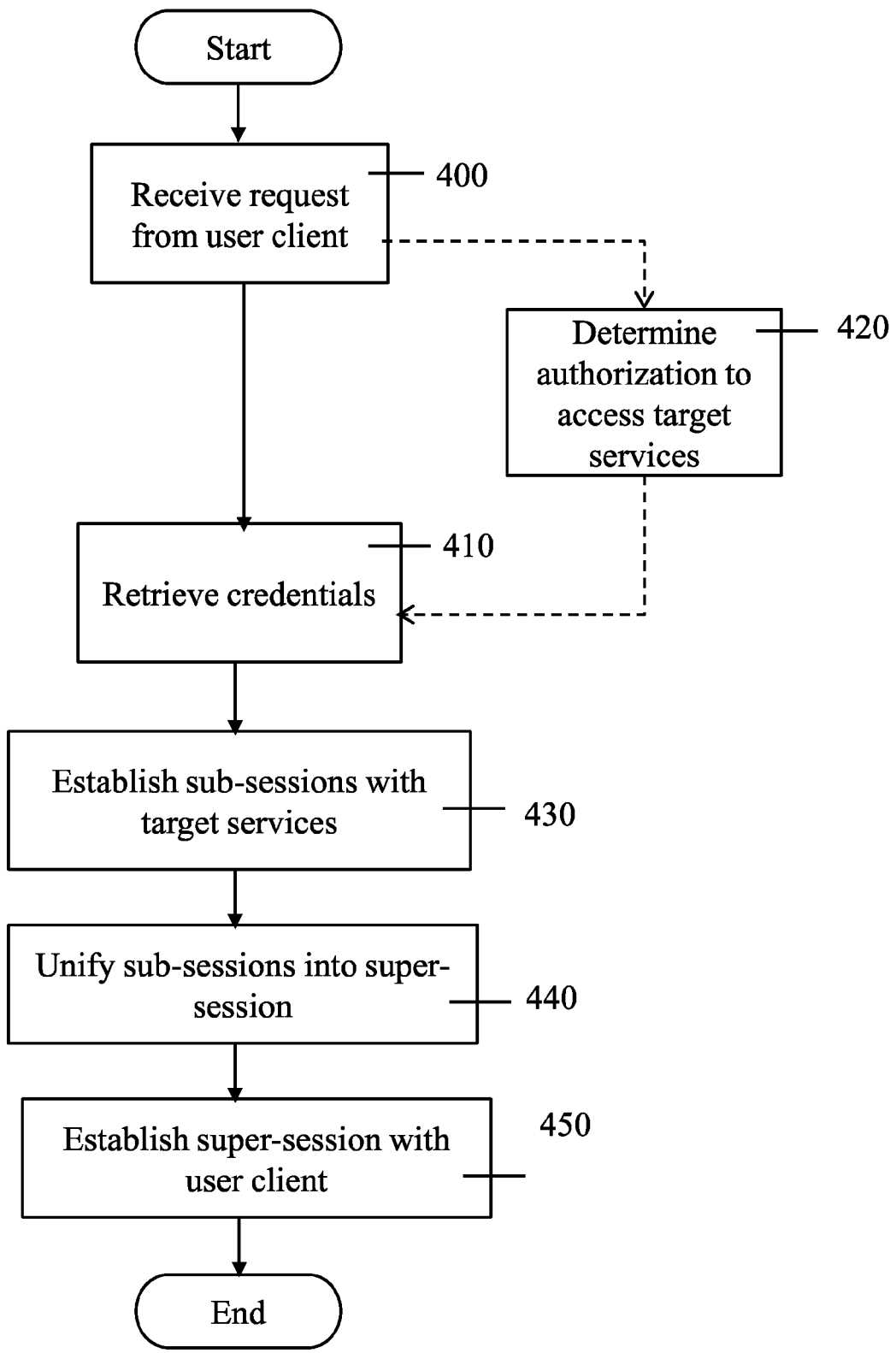
FIG. 4 is a simplified flowchart of a method of establishing privileged communication sessions to target services, according to embodiments of the invention.

Reference is now made to FIG. 4, which is a simplified flowchart of a method of establishing privileged communication sessions to target services, according to embodiments of the invention.

In 400, a request from a user client to access multiple target services is received at the intermediate element. The request includes authentication credentials which are used to authenticate the user and/or user client.

Optionally, some or all of the target services are specified explicitly in the request. Alternately or additionally, some or all of the target services are derived from the request. In some embodiments, the request specifies a task to be performed, and performing the task requires connection to a known group of target services. Some or all of the required target services may be not specified explicitly in the request, but are established as a sub-sessions since they are known to be required for performing the specified task.

In 410 the intermediate element retrieves privileged credentials for target services which require privileged access. This may ease approval and workflow processes since user authentication, authorization and credential retrieval may be performed together for multiple target services. Optionally the privileged credentials are retrieved from a PAMS.

Optionally, other target services are accessed using the authentication credentials and/or shared credentials (which are used by more than one user or user client) and/or null credentials (for services that do not require credentials to establish a session).

Optionally, in 420, the intermediate element determines whether the user client is authorized to access the requested target services. Credentials are retrieved in 410 only for authorized target services.

After the required credentials are obtained, in 430 interactive sub-sessions are established between the intermediate element and the target services using respective credential sets. Optionally, at least one of the sub-sessions is established with the privileged credentials (i.e. a privileged sub-session).

Optionally, the information used by the intermediate element to establish a sub-session includes one or more of:

1. The identity of the target service (e.g. IP address or a domain name of a Domain controller or a DB server, a URL of a web service etc.);
2. The client application that is used to perform the task or activity on the service (for example, vSphere client for VMWare, TOAD for DB access, IIS service manager for IIS management); and
3. Credentials for accessing the target service, such as privileged credentials.

In 440, the interactive sub-sessions are unified into a single super-session on the intermediate element.

In 450, the single super-session is established with the user client. The super-session is established in a manner that provides the user client with interactive control of each of the plurality of interactive sub-sessions. Optionally, the super-session provides the user with a unified user experience, in which the user experience is the substantially similar to user interaction with multiple communication sessions running in the same execution environment. Optionally, the intermediate element operates as a remote desktop server which communicates with the user client over a communication network.

Optionally, the super-session is established with shared resourcing, which means that resources are shared amongst the sub-sessions similarly to resource sharing amongst multiple communication sessions running in the same execution environment. Examples of shareable resources include: files, memory, CPU and clipboard.

Figure 5:
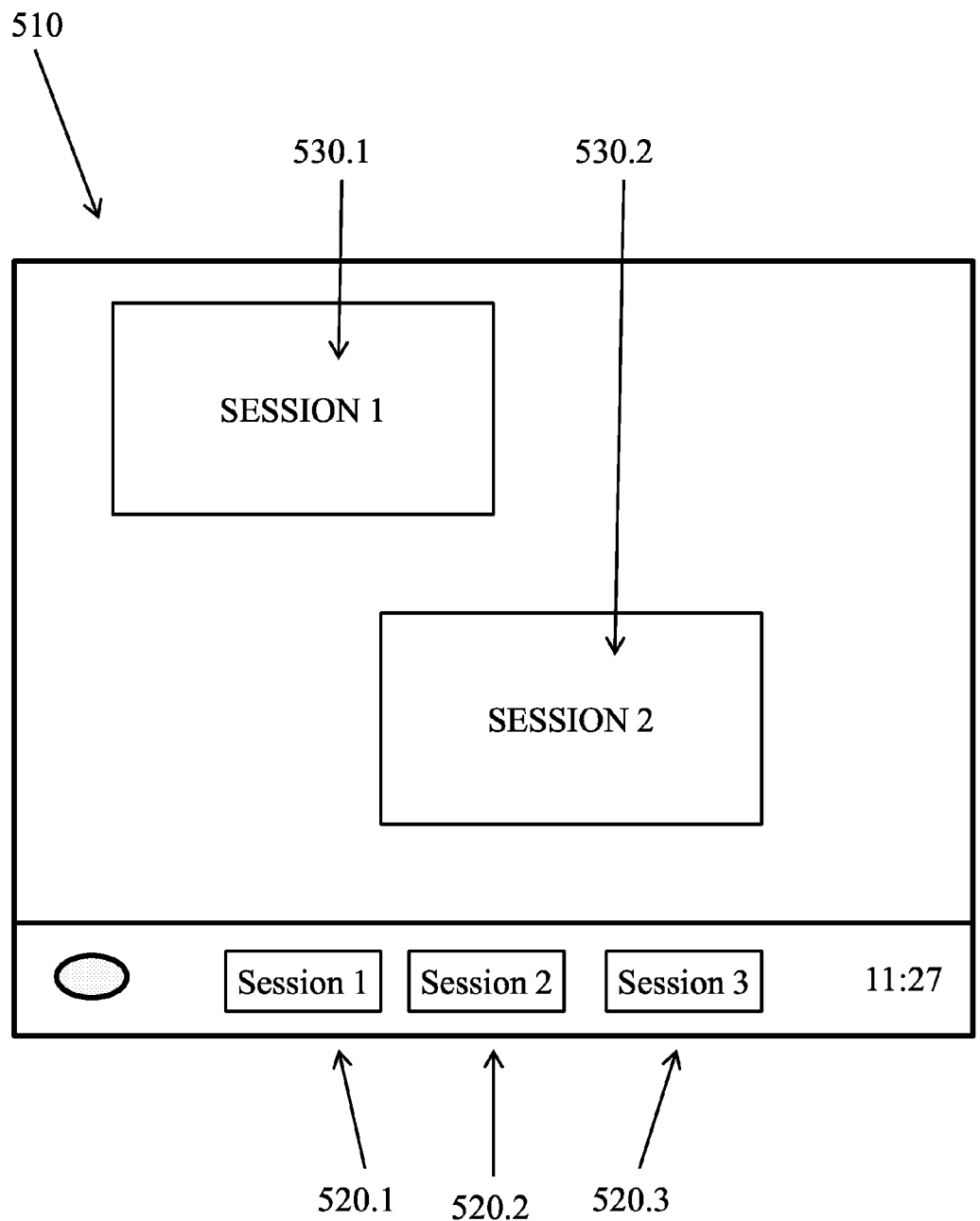
FIG. 5 is a simplified illustration of a unified user experience as provided by exemplary embodiments of the invention.

Reference is now made to FIG. 5, which is a simplified illustration of a unified user experience as provided by exemplary embodiments of the invention. Target service applications are launched to establish sub-sessions with three target services. Each sub-session may be established with a different set of credentials, where at least one of the sub-sessions is established with privileged credentials.

The user interacts with the three target services as if they were part of a single session running on a single desktop environment 510. Each target service is displayed as a window (530.1, 530.2 and minimized 530.3) on the desktop 510. The user may switch between the target services simply by clicking on the respective taskbar icon, 520.1, 520.2 or 520.3, without moving to a separate desktop environment.

Even though each window shows a separate sub-session, the unified user experience enables users to move between windows as if they are running in a single session with a single target service. A shared clipboard enables users to perform operations such as cut-and-paste between windows, rather than manually entering the same data into separate sessions.

Monitoring

Optionally, the super-session is monitored during all or part of the existence of the super-session. Data of interest is collected and stored, in accordance with considerations such as security, task flow management, resource management and privileged access considerations. Some or all of the sub-sessions participating in the super-session may be monitored.

Optionally, types of monitoring include one or more of:
1) Video monitoring;
2) Real-time monitoring (i.e. monitoring data is collected and reviewed at the time of occurrence);
3) Over the shoulder monitoring (i.e. user client actions are monitored while they are being performed); and
4) Command level monitoring (i.e. monitoring the commands executed in each sub-session and at the intermediate agent).

Optionally selected meta-data and/or other data is collected for the super-session and saved in a super-session data record.

Optionally, super-session monitoring is performed during the entire duration of the super-session. Alternately, super-session monitoring is performed on time-intervals within the super-session. The monitored time intervals may, for example, be specified by an administrator and/or be performed during certain portions of the task workflow.

Optionally, the super-session data record documents user client activities during the super-session as a correlated listing which presents the activities performed during multiple sub-sessions and, optionally, identifies connections between activities performed in different sub-sessions.

Optionally, user activities are stored chronologically, with a respective indicator of which sub-session (i.e. which target service) the activity was performed (e.g. see FIG. 6 described below). Thus, an auditor may not need to analyze each sub-session record separately since all user client activities are automatically correlated while the super-session is monitored.

Optionally, the super-session data record includes sub-session data records for all sub-sessions participating in the super-session. In some embodiments, selected meta-data and/or other data is collected for each sub-session and saved in a respective sub-session data record.

A sub-session data record optionally includes one or more of:
1. User (and/or user client) that is performing the sub-session;
2. Target service;
3. Connection details;
4. Client application that was invoked;
5. Video or text recording of what was done during the sub-session;
6. Audit records of activities performed in the sub-session; and
7. Audit records of sub-session starts/ends/connect/disconnect activities.

Optionally, information common to all of the sub-sessions is saved in the super-session data record, and is not saved separately for each sub-session. A super-session data optionally includes one or more of:
1. User (and/or user client) that is performing the super-session;
2. Video or text recording of what was done during the super-session; and
3. Audit records of super-session starts/ends/connect/disconnect activities.

Optionally, sub-session specific data is stored in the super-session data record separately per sub-session. Sub-session specific data optionally includes one or more of:
1. Target device/connection details;
2. Which client application was invoked;
3. Audit records of activities performed in the sub-session; and
4. Audit records of sub-session starts/ends/connect/disconnect activities.

Task Management

Optionally, the super-session is established to achieve a known task (e.g. a task specified by the user client in the super-session request). Activities which are inconsistent or unnecessary for accomplishing this task may indicate a problem such as unauthorized access to the target service and/or inappropriate use of a resource (e.g. data stored in a database). Missing and/or incorrectly ordered activities may indicate that the task is not being performed correctly (e.g. as required by the task workflow or ticket). Examples of tasks include: rebooting a database, configuring Internet Information Services (IIS) to extend its timeout settings, adding a user to a Windows domain, etc.

For example, consider a case in which in order to perform task A activities should take place on resources A1, A2 and A3. When a super-session is initiated to perform task A, an anomaly is detected if activities are performed only on resources A1 and A3 but not on resource A2.

Some embodiments of the invention include task management, which ensures that all workflow steps of the known task are followed and/or that deviations from the workflow are detected. Optionally, user client activities are monitored during a super-session in order to detect when they deviate from activities required to perform a specified task (e.g. extra or missing activities). An action is triggered when a deviation is detected. Optionally the triggered action includes one or more of:
i) Terminating at least one of the sub-sessions participating in the super-session;
ii) Terminating the super-session;
iii) Notifying an administrator;
iv) Notifying the user client about the deviation;
v) Storing an alert; and
vi) Sending an alert to another system.

Figure 6:
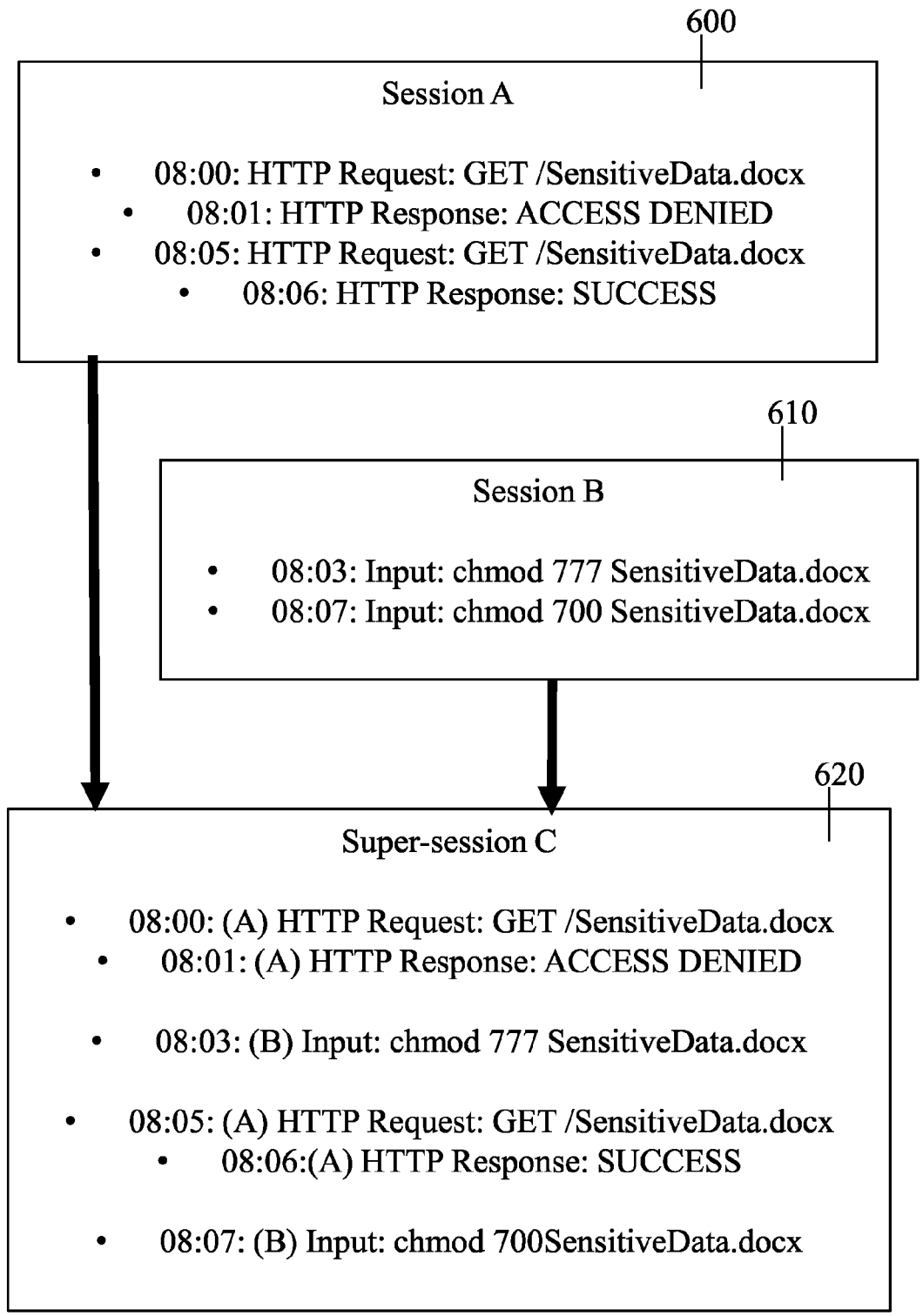
FIG. 6 illustrates an exemplary scenario in which two sub-sessions form a single super-session for auditing purposes.

Reference is now made to FIG. 6, which illustrates an exemplary scenario in which sub-session A 600 and sub-session B 610 form super-session C 620. Sub-session A 600 is a web session using the HTTP protocol and sub-session B 610 is an SSH session to the web server's host. In sub-session A 600 the user client tries to download a sensitive document file from the server twice. The first try fails while the second try succeeds. It is seen in super-session C 620 that in sub-session B 610 the user client granted public access to the same sensitive document referenced in session A 600 and then revoked the access. During super-session monitoring (and/or auditing) the correlation between the actions in sub-sessions A and B may be easily identified and a possible data theft may be detected.

Auditing

Optionally, auditing is performed on the super-session as a whole and/or on one or more sub-sessions. When the super-session (or selected sub-sessions) is audited, data is correlated between all of the sub-sessions of interest. The audit data may include the metadata of the super-session itself.

Optionally, activities performed in each of the sub-sessions are provided in chronological order throughout the super-session. Thus the auditor is provided with organized data of the activities performed throughout the whole super-session, which increases the auditor's ability to thoroughly understand the meanings and context of each of those activities.

Adding and Removing Sub-Sessions from a Super-Session

Optionally sub-sessions are added and/or removed during the course of the super-session, so that the number of sub-sessions included in the super-session varies over time.

Optionally, a sub-session is added to a super-session in response to one or more of:
 i. A request from the user client (for example when the user client requests to access a new target service);
 ii. A task management requirement; and
 iii. An instruction from an administrator.

Optionally, a sub-session is removed from a super-session in response to one or more of:
 i. A request from the user client (for example when the user client requests to disconnect from a target service);
 ii. A task management requirement;
 iii. A security protocol requirement; and
 iv. An instruction from an administrator.

When a sub-session is removed from a super-session it may happen that only a single sub-session remains in the super-session. Optionally, the session between the intermediate element and the user client continues to be managed as a super-session, so that new sub-sessions may be added without requiring reconfiguration back to a super-session.

Virtual Super-Session

Optionally, the intermediate element creates a "virtual super-session" which includes sub-sessions which were not requested and/or approved by the user client for inclusion in the super-session. Further optionally, the sub-sessions are added to the super-session without informing the user client.

The intermediate element optionally selects a session which is not part of the super-session. The selected session is conducted between the user client and the target service via the intermediate element. The data monitored for the selected session is added to the super-session data record, as if it were part of the super-session. In consequence, the data monitored during the super-session includes additional sub-sessions beyond those that were specified by the user client or derived directly from the user client request.

Session Manager

Figure 7:
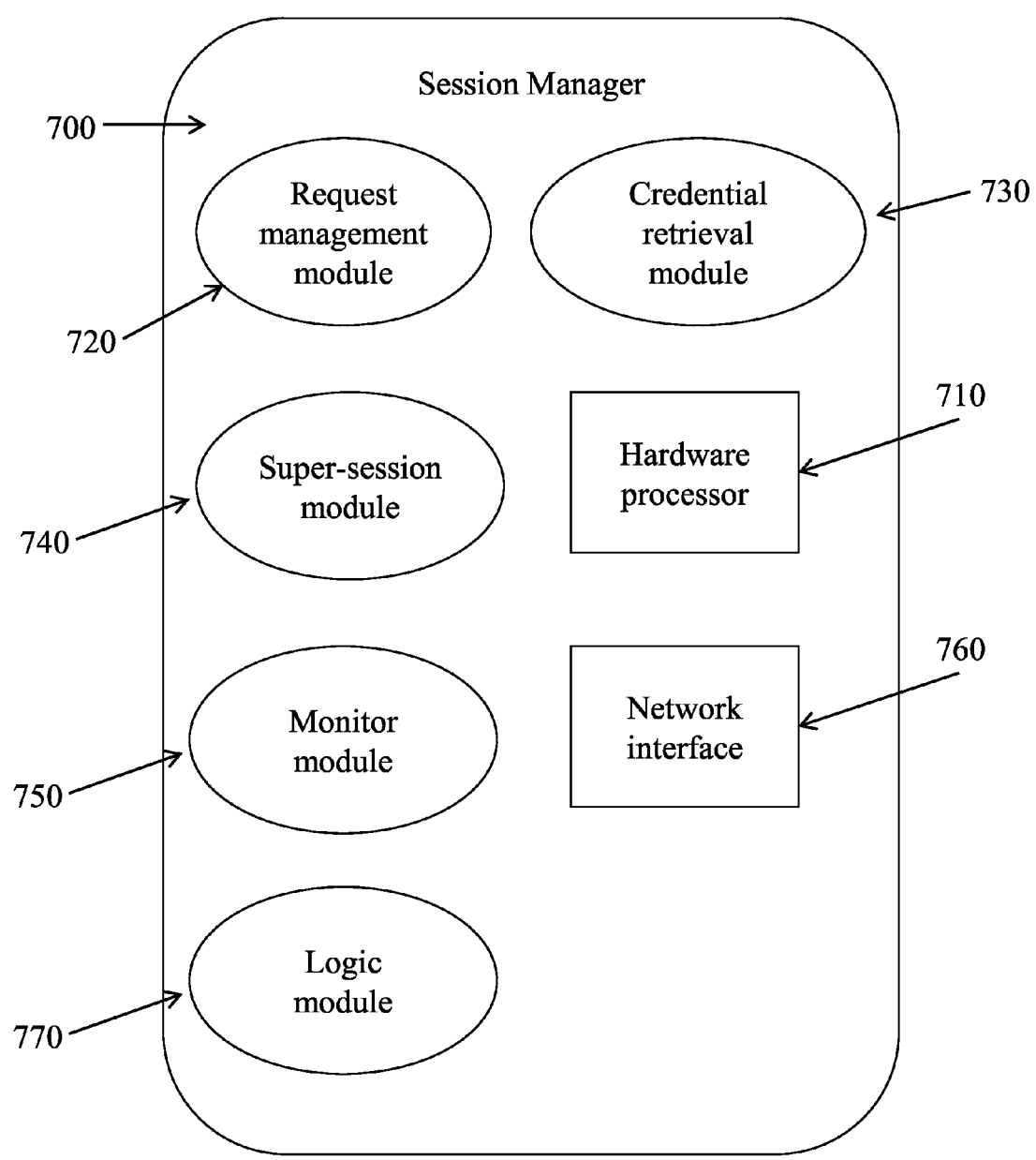
FIG. 7 is a simplified block diagram of a session manager, according to embodiments of the invention.

Reference is now made to FIG. 7, which is a simplified block diagram of a session manager, according to embodiments of the invention. Data communication between the user client and the target services is conducted via the session manager.

Session manager 700 includes:
 i) Hardware processor 710 which performs hardware processing operations;
 ii) Request management module 720;
 iii) Credential retrieval module 730; and
 iv) Super-session module 740.

Request management module 720, receives user client requests to establish sessions with multiple target services. The request includes authentication credentials. Optionally, request management module 720 derives at least one of the multiple target services from a task specified in the user client request.

Credential retrieval module 730 retrieves privileged credentials for target services which require privileged access. Optionally, credential retrieval module 730 obtains other credential sets for non-privileged target services when the authentication credentials provided with the request do not allow access to the target service.

Optionally, credential retrieval module 730 determines whether the user client is authorized to access the target services and retrieves credentials only for authorized target services.

Super-session module 740 establishes a super-session with the user client and interactive sub-sessions with target services. The sub-sessions are established using respective credential sets as needed. The sub-sessions are unified into the single super-session established with the user client. The super-session provides the user client with interactive control of each of the interactive sub-sessions. Optionally, super-session module 740 establishes the single super-session such that the user experience of interaction with the multiple interactive sub-sessions is that of a multiple communication sessions running in the same execution environment.

Optionally, session manager 700 includes monitor module 750. Monitor module 750 performs at least one of:
 i) Monitoring user client activities during the super-session;
 ii) Monitoring user client activities during a sub-session;
 iii) Detecting when user client activities deviate from activities required to perform a specified task;
 iv) Auditing the super-session;
 v) Detecting anomalies in user client utilization of the target services; and
 vi) Triggering an action when user client activities during the super-session deviate from activities required to perform a specified task and/or when anomalies in user client utilization of the target services are detected.

Optionally, session manager 700 includes network interface 760 for electrical communication over a communication network with a user client and/or at least one system node running a target service.

Optionally, session manager 700 includes logic module 770 which performs the logic functions (and/or contains instructions for hardware processor 710) required to obtain and assign correct privileged credentials for establishing sub-sessions. Optionally, session manager 700 runs on a proxy server which is inline between the user client and the target services, and prevents direct access to the target services by the user client. Optionally, at least one of the target services runs on the proxy server.

Optionally, session manager 700 runs on the endpoint running the user client. The session manager does not divulge the privileged credentials to the user client.

Figure 8:
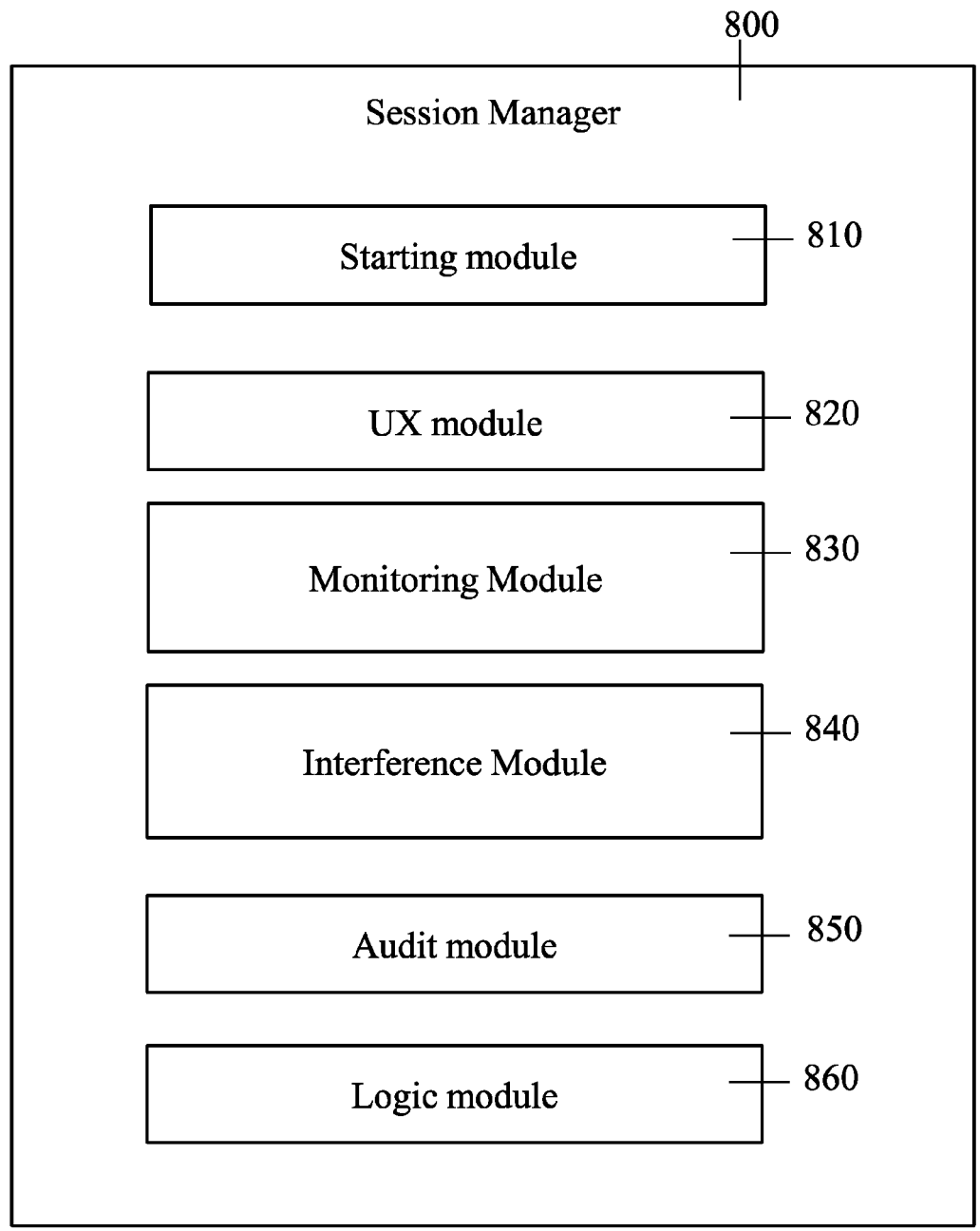
FIG. 8 is a simplified block diagram of a session manager according to exemplary embodiments of the invention.

Reference is now made to FIG. 8, which is a simplified block diagram of a session manager according to exemplary embodiments of the invention.

In the exemplary embodiment, session manager 800 runs on a proxy server and includes the following starting module 810 and user experience (UX) module 820. Optionally, session manager 800 further includes at least one of: Monitoring module 830, Interference module 840, Audit module 850 and Logic module 860.

A) Starting module 810: Starting module 810 receives requests to start a super-session which includes multiple sub-sessions, each sub-session being to a respective target service. Starting module 810 establishes communication sessions over a communication network to the machines hosting the target services using credentials (optionally provided by PAMS) and establishes the remote application connection to the user client. When the session manager and/or target services are located on the user client endpoint, some data communication may be internal and not over a communication network. Starting module 810 corresponds substantially to the combination of request management module 720, credential retrieval module 730 and super-session module 740 described above.

In some embodiments the sub-session is initiated by: creating a communication session between the user client and the machine hosting the target service, invoking the relevant target service application, and providing the target service details and relevant privileged credentials that were provided by the PAMS. Each of the started sub-sessions is added as a record to the system's database and will be correlated to the super-session.

In some embodiments, at least one of the sub-sessions requires privileged credentials. In some embodiments, the user client has privileged credentials and the target service is accessed with the privileged credentials provided by the user client. Additionally or alternately, the PAMS issues privileged credentials which are used to establish the sub-session without providing the privileged credentials to the user. In further embodiments, the user client provides a single set of credentials, and PAMS supplies a set of privileged credentials for each of the requested target services. Each of the requested target services is accessed with the respective privileged credentials.

B) User Experience (UX) module 820: UX module 820 creates a single-session user experience even when the super-session contains multiple communication sessions. (In the embodiments of FIG. 7, UX unification functionality is optionally incorporated into super-session module 740.) For example, when a user requests a super-session which includes two communication sessions, one to an Oracle DB server using SQLPlus software and one to an SSH target service using SSH software, UX module 820 displays both communication sessions to the end user in a single display. This retains the user experience of similar communication sessions performed without any monitoring/management system, while supporting sub-sessions established with the Oracle DB and the SSH target service using secured privileged credentials.

C) Monitoring module 830: Monitoring module 830 monitors the super-session as a whole and, optionally, monitors sub-sessions and other components of the super-session individually.

Optionally, monitoring the super-session includes one or more of:

1) Monitoring the user client;
2) Monitoring a network resource associated with the user client. A network resource may be any hardware or software resource that is available to multiple elements residing on, or connecting to, the network. (Examples of network resources include a network printer, a network drive, data processing hardware/software, etc.);
3) Monitoring the system hosting a target service;
4) Monitoring the communications network of the organization associated with the target service; and
5) Monitoring the communications network of the organization associated with the network resource associated with the target service.

Optionally, types of monitoring include one or more of:
1) Video monitoring;
2) Real-time monitoring;
3) Over the shoulder monitoring; and
4) Command level monitoring.

Optionally, different types of monitoring may be performed on different sub-sessions or on different aspects of the super-session. For example, the communication network of an organization hosting one target service may be monitored, while for a different target service only command level monitoring is performed.

Optionally, super-session monitoring includes detecting anomalous activity and/or potential hazards. Optionally, hazard detection is performed for at least one of:

1) The target service;
2) The network resource associated with the target service;
3) The system hosting a target service;
4) The communication network of the organization associated with the target service; and
5) The communication network of the organization associated with the network resource associated with the target service.

D) Interference Module 840: Optionally, when an anomalous activity and/or potential hazard is detected, interference module 840 performs at least one interference action. Additionally or alternately, interference module 840 performs at least one interference action in response to an external trigger.

Optionally, the interference actions include one or more of:

i) Sending limiting commands to one or more of the sub-sessions;
ii) Sending limiting commands to the super-session;
iii) Ending one or more of the sub-sessions; and
iv) Ending/terminating the super-session.

E) Audit module 850: Audit module 850 audits monitored and/or non-monitored super-sessions by displaying the different events that occur during the super-session, and optionally other types of stored information regarding the super-session. The super-session activities, activities and other information are organized for display to an auditor in a correlated manner.

F) Logic module 860: Logic module 860 performs the required logic activities and analyses. For example logic module 860 may correlate different sub-sessions as one super-session according to session metadata or actions and/or the logic that performs a single workflow (ticketing system, dual control, reason, etc.) for all of the sub-sessions that are part of the same super-session.

The combination of monitoring module 830, interference module 840 and audit module 850 correspond substantially to monitor module 750 of FIG. 7.

Figure 9:
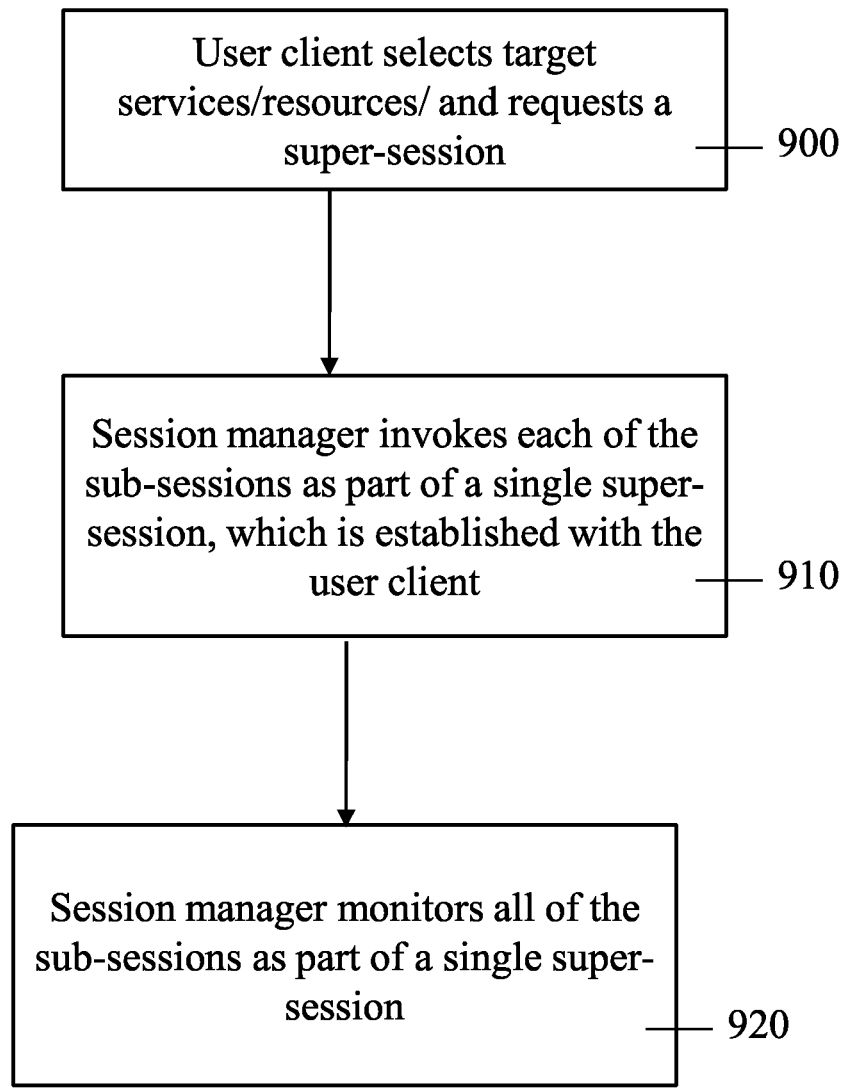
FIG. 9 is a simplified flowchart of an exemplary method for creating a super-session according to embodiments of the invention.

Reference is now made to FIG. 9, which is a simplified flowchart of an exemplary method for creating a super-session according to embodiments of the invention. In 900 the user client requests to establish a super-session with multiple target services (e.g. target resources) and provides credentials. Optionally, the request includes additional information (e.g. end point identification, data communication information, etc.).

Optionally, the credentials are provided to a PAMS, which authenticates the user client credentials and verifies that the user client is authorized to access all of the requested target services. The PAMS provides privileged credentials required for establishing some or all of the sub-sessions.

In 910, a super-session is created by the session manager by adding a new super-session data record to a session database and by initiating an interactive sub-session between the session manager and each of the requested target services. The super-session is established between the session manager and the user-client.

In 920 the session manager monitors all of the sub-sessions as part of a single super-session.

Figure 10:
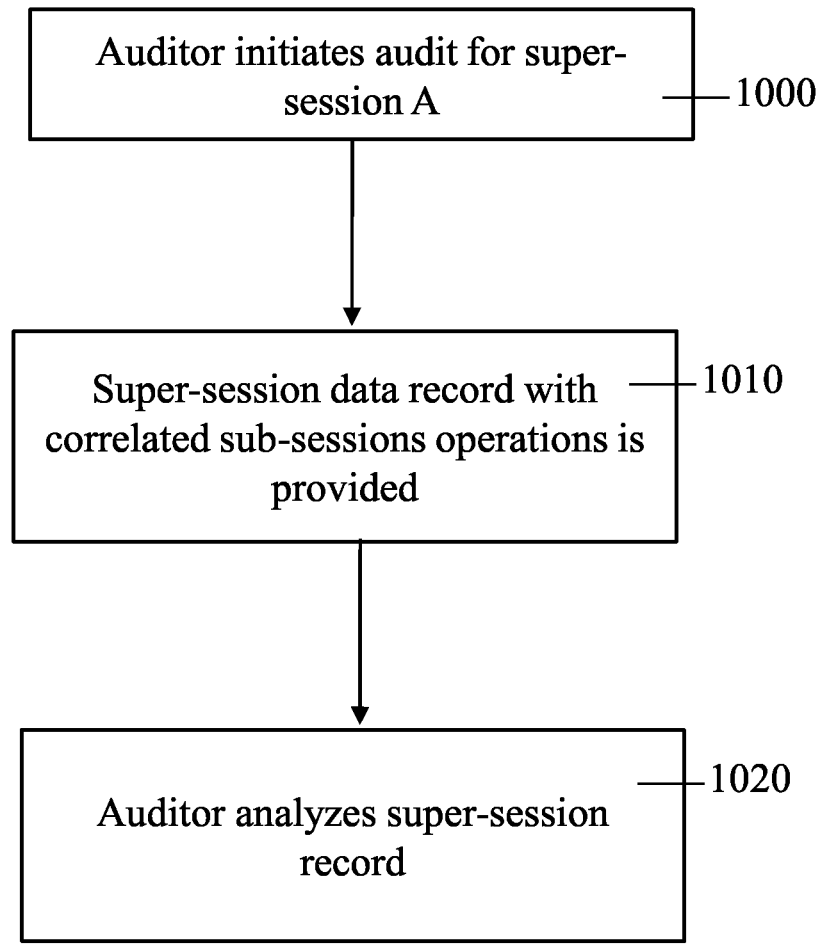
FIG. 10 is a simplified flowchart of an exemplary method of auditing super-sessions according to embodiments of the invention.

Reference is now made to FIG. 10, which is a simplified flowchart of an exemplary method of auditing super-sessions according to embodiments of the invention. In 1000 an auditor initiates an audit of the super-session. In 1010 the super-session data record is provided. The super-session data record includes a correlated listing of activities performed in the sub-sessions which form the super-session, and may include other information (such as sub-session and super-session meta-data). In 1020 the super-session data record is analyzed by the auditor (e.g. by audit module 850 and/or by a human auditor via a user interface).

Optionally, all of the sub-sessions contained in the super-session are part of the same workflow mechanism (i.e. ticketing system integration or dual control request). The auditor may audit all related sessions to the same workflow (i.e. to a specific ticket ID) in a straightforward manner, without first gathering information from multiple workflows. For example, a specific ticket ID with description "delete all resources related to incident A" may show a list of all sub-sessions that are related to that specific ticket. The auditor may ensure that all resources were actually deleted and that only actions related to the ticket's descriptions were performed during the super-session.

Task Management Example

Optionally, monitoring module 830 performs task/workflow management. Consider the example of a task (e.g. a specific ticket ID) with the description "delete all resources related to incident A". The ticket lists all sub-sessions that are related to that ticket. Thus an auditor is able to make sure that all resources were actually deleted and that only actions related to the ticket's content were performed during the super-session.

Workflow management may be performed as follows:

1. Request—When an end-user (IT user) would like to perform a bunch of activities (e.g. "Patch DB to latest KB") that require different accounts (permissions and/or credentials), the user includes all of the accounts in a single request (e.g. sysoper access and sysdba access to patch the DB).

2. Approval workflow—The request approval is handled as a single "package", and may be through a ticketing system or through a dual control process (which requires approval by a human administrator or other authorized person). Since the request specified the desired activities and the target services, the approving entities are able to understand the workflow (e.g. "Patch DB to latest KB with 2 privileged DB users") and the approval process is faster and more controlled.

3. During the task—The user presses "connect" and the session manager automatically opens the sub-session with approved target services. The sub-sessions are unified into the super-session. Optionally no exceptions are allowed, so that if the user asks for new target service from within the controlled super session the request is denied.

Since all the sub-sessions included in the super-session are part of the same workflow mechanism (i.e. ticketing system integration or dual control request), the auditor is able to audit all related sessions to the same workflow (i.e. to a specific ticket ID) in a plain and straight forward method.

Toad™ Application Super-Session Example

In one example of a super-session, a user client connects to the session manager in order to establish a super-session. In this example Toad™ is used as an exemplary SQL client. A super-session is established between the user client and the session manager. The session manager opens a Toad™ application, which enables access to and management of SQL servers. From the super-session, the user may open multiple connections with multiple credentials to multiple targets, without leaving the super-session, without leaving the application (e.g. Toad™) and without knowing the credentials required to connect to target databases using the Toad™ application.

In order to access multiple target databases using Toad™, the user, from inside the Toad™ application, types or selects SYSOPER user information (without the user credential) and presses connect. The given information is passed to a predefined PAMS. When the end user has permission (i.e. is authorized) to use the requested target resources, SYSOPER user credential are passed to start a sub-session, connecting to Database A as SYSOPER and to start database backup.

The end-user selects Session>New Connection from within the Toad™ application menu bar, and types/selects SYSDABA user information (without the user credential) and presses connect. The given information is passed to the PAMS. When the end user has permission to use the requested target resources, SYSDABA user credentials are passed, the second sub-session starts and the user connects to the database as SYSDBA and performs DBA tasks.

Super-session embodiments described herein enable a user to establish a single super-session which provides the user with interactive access to multiple resources. The user has a familiar user experience and is able to move between the sub-sessions seamlessly. Additionally, super-sessions may improve an auditor's capabilities to correlate between different sub-sessions, and to more easily understand the connections between activities performed during the various sub-sessions, what resources were accessed during the super-session and other information of interest.

The methods as described above are used in the fabrication of integrated circuit chips.

The flowchart and block diagrams in the Figures illustrate the architecture, functionality, and activity of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant user clients, user endpoints, proxy servers, account management, credential management, task management, session auditing, session monitoring and target services will be developed and the scope of the term user client, endpoint, proxy server, account management, credential management, task management, session auditing, session monitoring and target service include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of establishing privileged communication sessions to target services, comprising:
    executing, at an intermediate element, by at least one hardware processor of at least one server;
    receiving, over a network from a client machine running a user client application, a request to access a plurality of target services, wherein said request comprises authentication credentials;
    using said authentication credentials, retrieving, for at least one of said plurality of target services, a respective set of privileged credentials;
    establishing, over said network, a plurality of interactive sub-sessions between said intermediate element and respective ones of said plurality of target services, wherein at least one of said sub-sessions is established with said respective set of privileged credentials;
    unifying said plurality of interactive sub-sessions into a single super-session on said intermediate element and creating a super-session data record to document activities performed by said user client application during said plurality of interactive sub-sessions;
    establishing, over said network, said single super-session with said user client application, such that said single super-session provides said user client application with interactive control of each of said plurality of interactive sub-sessions established with said respective ones of said plurality of target services;
    during said single super-session, identifying connections between said activities performed by said user client application during said plurality of interactive sub-sessions and maintaining, in said super-session data record, a correlated listing of said identified connections between said activities performed by said user client application in said plurality of said interactive sub-sessions; and
    during said single super-session, managing activities performed by said user client application during different interactive sub-sessions of said super-session by analyzing said correlated listing of identified connections, wherein said managing activities comprising managing activities for performing a task using said single super-session, wherein said plurality of said target services perform different respective aspects of said task,
    wherein data communication between said user client application and said plurality of target services is conducted via said intermediate element.

2. A method according to claim 1, further comprising: at said intermediate element, establishing said single super-session such that the user experience of interaction with said plurality of interactive sub-sessions is that of multiple communication sessions running in the same execution environment.

3. A method according to claim 2, further comprising: at said intermediate element, communicating with said user client application, over a communication network, as a remote desktop server.

4. A method according to claim 1, further comprising: at said intermediate element, establishing said single super-session such that the sharing of resources amongst said plurality of interactive sub-sessions is that of multiple communication sessions running in the same execution environment.

5. A method according to claim 4, wherein said resources comprise at least one of: a data file, a memory, a CPU and a clipboard.

6. A method according to claim 1, further comprising:
    determining, using said authentication credentials, an authorization of said user client application to access said plurality of target services; and
    preventing establishment of sub-sessions with unauthorized target services.

7. A method according to claim 1, wherein said request comprises a list of requested target services and said sub-sessions are established with said listed target services.

8. A method according to claim 1, wherein said request is a request to establish a super-session, further comprising: receiving from said user client application, after said single super-session is established between said user client application and said intermediate element; a list specifying said plurality of said target services, wherein said sub-sessions are established with said listed target services.

9. A method according to claim 1, wherein said request is a request to perform a specified task, and at least one of said plurality of target services are derived, at said intermediate element, from said specified task.

10. A method according to claim 1, further comprising: at said intermediate element, monitoring activities performed by said user client application during said single super-session, detecting when said activities deviate from activities required to perform a specified task and triggering an action when a deviation is detected.

11. A method according to claim 10, wherein said action comprises at least one of: terminating at least one of said sub-sessions, terminating said single super-session and notifying an administrator.

12. A method according to claim 1, further comprising: at said intermediate element, auditing said single super-session and detecting anomalies in utilization by said user client application of said plurality of target services.

13. A method according to claim 1, further comprising: at said intermediate element; adding a sub-session to said single super-session.

14. A method according to claim 13, wherein said sub-session is added in response to at least one of:
 i. a request from said user client application to connect to an additional target service;
 ii. a task management requirement; and
 iii. an instruction from an administrator.

15. A method according to claim 1, further comprising: at said intermediate element, removing a sub-session from said single super-session.

16. A method according to claim 15, wherein said sub-session is removed in response to at least one of:
 i. a request from said user client application to disconnect from a target service;
 ii. a task management requirement;
 iii. a security protocol requirement; and
 iv. an instruction from an administrator.

17. A method according to claim 1, wherein at least one of said sub-sessions is established with said authentication credentials.

18. A method according to claim 1, wherein said privileged credentials are retrieved from a privileged account management system (PAMS).

19. A method according to claim 1, wherein all of said sub-sessions are performed by a single user client application.

20. A method according to claim 1, further comprising triggering an action with regards to said activities managed during said single super-session.

21. A method according to claim 1, wherein said managing activities comprises auditing activities performed by said user client application during said plurality of interactive sub-sessions.

22. A method according to claim 1, wherein said managing activities comprises monitoring activities performed by said user client application during said plurality of interactive sub-sessions.

23. A method according to claim 1, wherein said managing activities comprises managing activities performed by said user client application during said plurality of said interactive sub-sessions to ensure a workflow required to accomplish said task.

24. A session manager apparatus, comprising:
 a hardware processor;
 a request management module, in electronic communication with said hardware processor, configured to receive a request from a user client application to establish sessions with a plurality of target services, wherein said request comprises authentication credentials;
 a credential retrieval module, in electronic communication with said hardware processor and said request management module, configured to use said authentication credentials to retrieve, for at least one of said plurality of target services, a respective set of privileged credentials; and
 a super-session module, in electronic communication with said hardware processor, said request management module and said credential retrieval module, configured to:
  establish a plurality of interactive sub-sessions with said plurality of target services, wherein at least one of said sub-sessions is established with said respective set of privileged credentials;
  unify said plurality of interactive sub-sessions into a single super-session, and create a super-session data record to document activities performed by said user client application during said plurality of interactive sub-sessions;
  establish said single super-session with said user client application, such that said single super-session provides said user client application with interactive control of each of said plurality of interactive sub-sessions established with said respective ones of said plurality of target services; and
  during said single super-session:
   identify connections between said activities performed by said user client application during said plurality of interactive sub-sessions;
   maintain, in said super-session data record, a correlated listing of said identified connections between said activities performed by said user client application in said plurality of said interactive sub-sessions; and
   manage activities performed by said user client application during different interactive sub-sessions of said super-session by analyzing said correlated listing of identified connections, said managing activities comprising managing activities for performing a task using said single super-session, wherein said plurality of said target services perform different respective aspects of said task.

25. An apparatus according to claim 24, wherein said credential retrieval module is further configured to determine a respective authorization to access said plurality of target services, and wherein said super-session module is configured to establish sub-sessions only with authorized target services.

26. An apparatus according to claim 24, wherein said super-session module is further configured to establish said single super-session such that the user experience of interaction with said plurality of interactive sub-sessions is that of multiple communication sessions running in the same execution environment.

27. An apparatus according to claim 24, wherein said super-session module is further configured to establish said single super-session such that the sharing of resources amongst said plurality of interactive sub-sessions is that of multiple communication sessions running in the same execution environment.

28. An apparatus according to claim 24, wherein said request is a request to perform a specified task, wherein said request management module is further configured to derive at least one of said plurality of target services from said specified task.

29. An apparatus according to claim 24, wherein data communication between said user client application and said plurality of target services is conducted via said session manager apparatus.

30. An apparatus according to claim 24, further comprising a network interface for electronic communication over a communication network with at least one of said user client application and a system node running a target service.

31. An apparatus according to claim 24, wherein said session manager apparatus runs on a proxy server inline between a client machine running said user client application and said plurality of target services.

32. An apparatus according to claim 24, wherein said session manager apparatus runs on an endpoint machine hosting said user client application.

33. An apparatus according to claim 24, further comprising a monitoring module configured to perform at least one of:
  monitoring activities performed by said user client application during said single super-session;
  monitoring activities performed by said user client application during a sub-session;
  detecting when activities performed by said user client application deviate from activities required to perform a specified task;
  triggering an action when activities performed by said user client application during said single super-session deviate from activities required to perform a specified task;
  auditing said single super-session; and
  detecting anomalies in utilization of said plurality of target services by said user client application.

34. An apparatus according to claim 24, wherein said managing activities comprises managing activities performed by said user client application during said plurality of said interactive sub-sessions to ensure a workflow required to accomplish said task.

35. A computer program product for establishing privileged communication sessions to target services, comprising:
  a computer readable non-transitory storage medium;
  first program instructions to receive from a user client application a request to access a plurality of target services, wherein said request comprises authentication credentials;
  second program instructions to use said authentication credentials to retrieve a respective set of privileged credentials for at least one of said plurality of target services;
  third program instructions to establish a plurality of interactive sub-sessions between said intermediate element and respective ones of said plurality of target services, wherein at least one of said sub-sessions is established with said respective set of privileged credentials;
  fourth program instructions to unify said plurality of interactive sub-sessions into a single super-session and to create a super-session data record to document activities performed by said user client application during said plurality of interactive sub-sessions;
  fifth program instructions to establish said single super-session with said user client application, such that said single super-session provides said user client application with interactive control of each of said plurality of interactive sub-sessions established with said respective ones of said plurality of target services;
  sixth program instructions to identify, during said single super-session, connections between said activities performed by said user client application during said plurality of interactive sub-sessions and maintaining, in said super-session data record, a correlated listing of said identified connections between said activities performed by said user client application in said plurality of said interactive sub-sessions; and
  seventh program instructions to manage, during said single super-session, activities performed by said user client application during different interactive sub-sessions of said super-session by analyzing said correlated listing of identified connections, to perform a task using said single super-session, wherein said plurality of said target services perform different respective aspects of said task,
  wherein data communication between said user client application and said plurality of target services is conducted via an intermediate element, and wherein said first, second, third, fourth, fifth, sixth and seventh program instructions are stored on said computer readable storage medium.

36. A computer program product according to claim 35, wherein said third program instructions establish said sub-sessions between said intermediate element and said plurality of target services, and said fifth program instructions establish said single super-session between said intermediate element and said user client application.

37. A computer program product according to claim 35, further comprising eighth program instructions, stored on the computer readable storage medium, to determine a respective authorization to access said plurality of target services, wherein sub-sessions are established only with authorized target services.

* * * * *